Dec. 13, 1955  M. H. BRITTAIN  2,726,652
MASONRY SAW
Filed Aug. 30, 1954  2 Sheets-Sheet 1
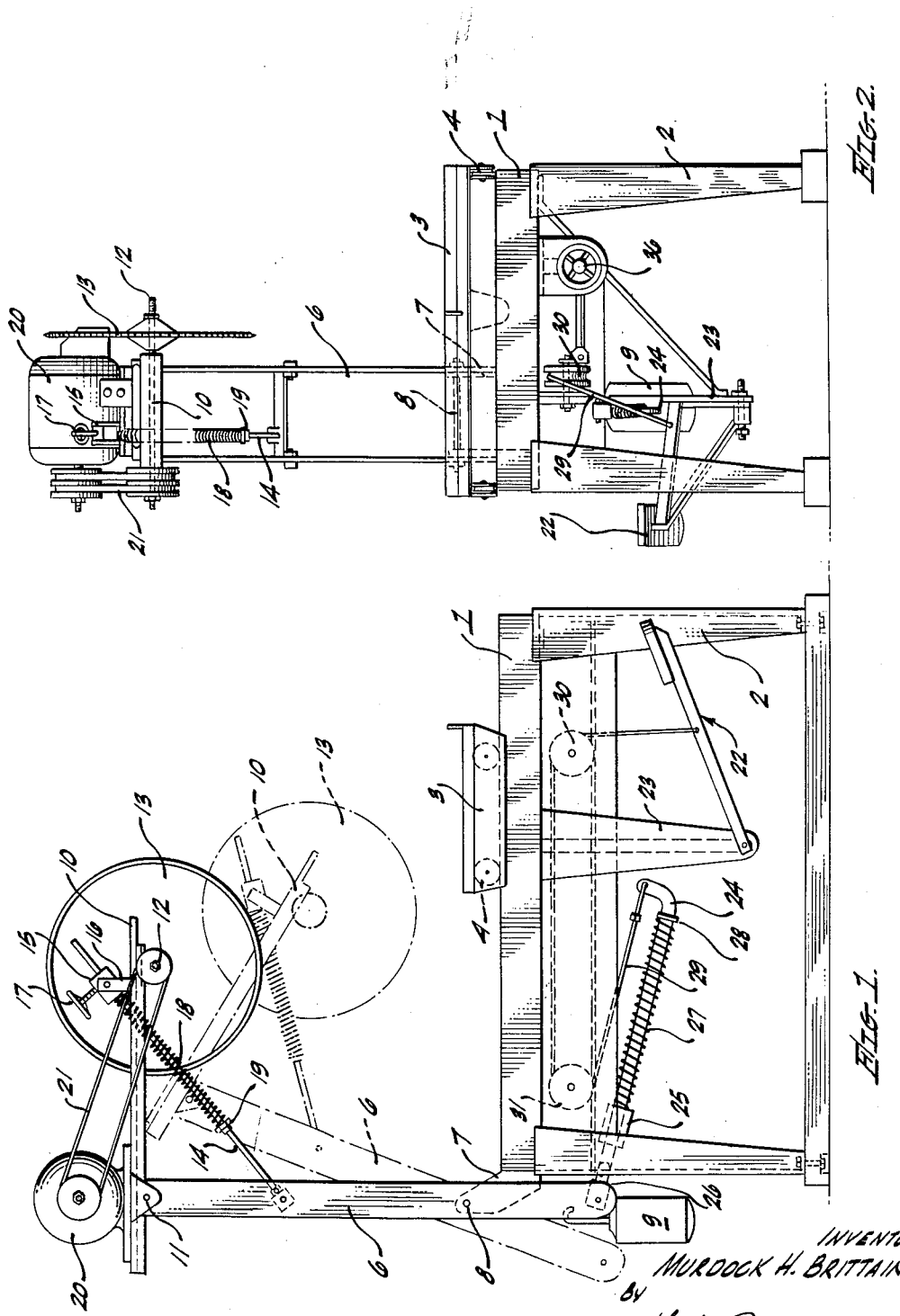
INVENTOR.
MURDOCK H. BRITTAIN,
BY
ATTORNEY.

Dec. 13, 1955 M. H. BRITTAIN 2,726,652
MASONRY SAW
Filed Aug. 30, 1954 2 Sheets-Sheet 2
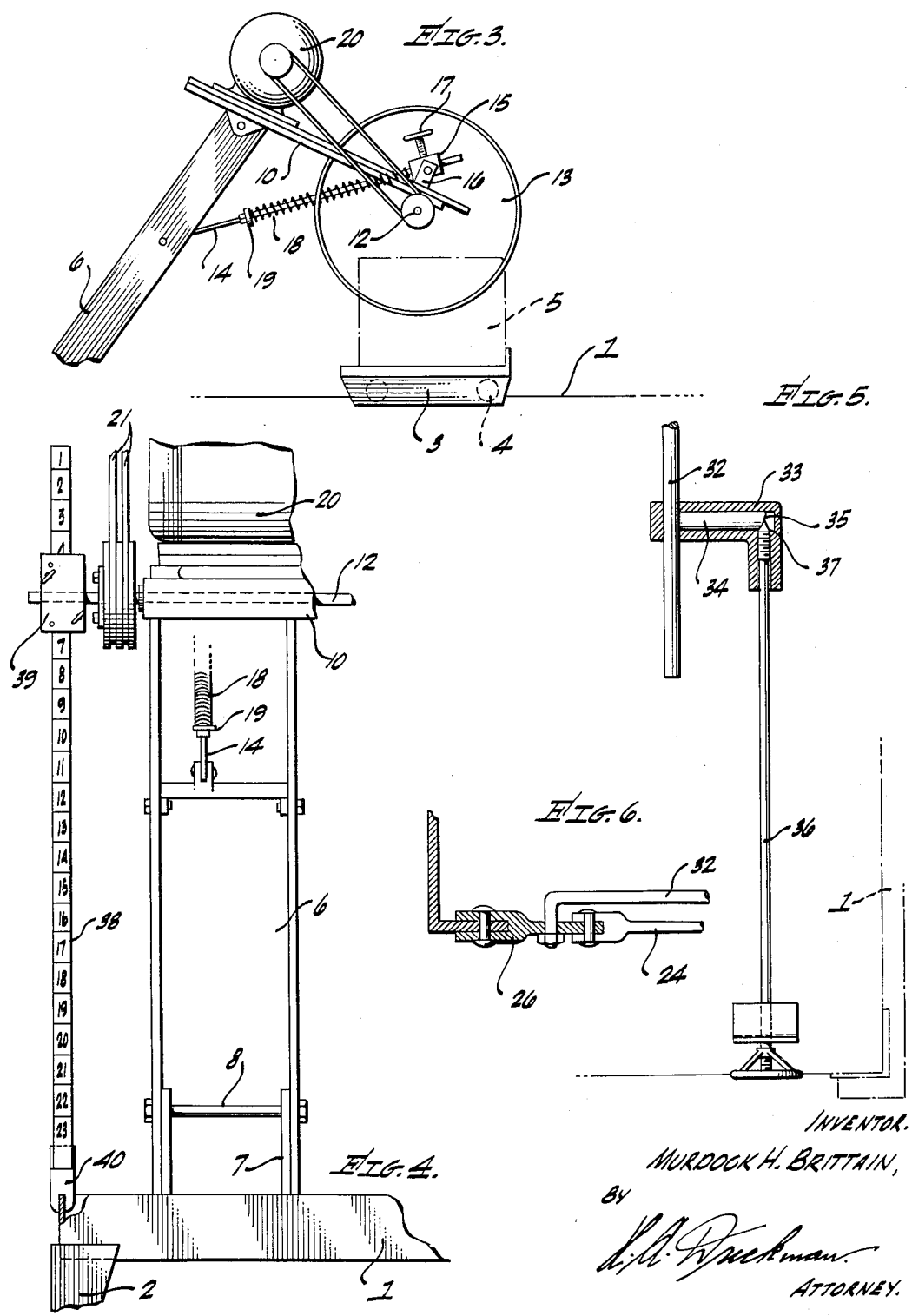
INVENTOR.
MURDOCK H. BRITTAIN,
BY
ATTORNEY.

United States Patent Office 2,726,652
Patented Dec. 13, 1955

2,726,652

MASONRY SAW

Murdock H. Brittain, Long Beach, Calif.

Application August 30, 1954, Serial No. 453,086

6 Claims. (Cl. 125—13)

This invention relates to a masonry saw, whereby blocks of stone or ceramic products may be cut or shaped to the proper size by means of a rotating saw.

An object of my invention is to provide a masonry saw, in which the arbor frame upon which the saw is mounted may be lowered into cutting position by means of a foot pedal which is actuated by the operator.

An object of my invention is to provide a novel masonry saw of the character stated in which the arbor frame, which carries the cutting saw and the motor drive therefor, is mounted on a supporting channel, this supporting channel in turn being pivotally mounted on the frame of the device; the supporting channel being tilted by a foot lever.

Another object of my invention is to provide a novel masonry saw in which both the arbor frame and the supporting channel therefor may each be latched or locked in a position whereby the masonry saw is adjusted vertically.

Another object of my invention is to provide a novel masonry saw of the character stated, in which the arbor frame which carries the saw can be adjusted or tilted relative to its supporting channel, and may be locked in that angular or tilted position for the purpose of adjusting the saw relative to the main frame of the device.

Other objects, advantages and features of invention may appear from the accompanying drawing, the subjoined detailed description and the appended claims.

In the drawing:

Figure 1 is a side elevation of my masonry saw.

Figure 2 is a front elevation of the same.

Figure 3 is a fragmentary side elevation of the arbor frame and the supporting channel showing the saw in cutting position.

Figure 4 is a fragmentary front elevation of the supporting frame showing the measuring stick in position.

Figure 5 is a top plan view with parts broken away to show interior construction of the supporting channel locking mechanism.

Figure 6 is a fragmentary horizontal sectional view of the supporting channel and the lock rod mounted thereon.

Referring more particularly to the drawing, the numeral 1 indicates a main frame rectangular in shape and preferably formed of angle iron, one flange of the angle being vertical for the purpose of forming a trackway, as will be subsequently described. The frame 1 is supported on legs 2 which are attached thereto in a usual and well known manner. A carriage 3 is provided with a plurality of wheels 4 which roll on the flange of the frame 1 and permit the stone or the object 5 to be cut to be moved horizontally on the frame 1 and, therefore, against the saw which is positioned above the carriage 3, as will be further described. A supporting channel 6 is pivotally mounted on the rear end of the frame 1 as follows: A bracket 7 is fixedly mounted on the frame 1, projects upwardly and rearwardly substantially as shown, and a pivot bolt 8 extends through this bracket and through the supporting channel, thus pivotally mounting the supporting channel on the frame 1. A counterweight 9 on the lower end of the channel 6 normally holds the channel in a vertical position. This weight assists in urging the supporting channel to its vertical position. An arbor frame 10 is pivotally mounted on the upper end of the supporting channel 6 by means of the pivot pin 11. A spindle or quill 12 is journaled on the forward end of the arbor frame 10 and a saw 13, of the diamond or other abrasive type, is mounted on the quill. The saw 13 is positioned on one side of the arbor frame 10 and also towards one side of the supporting channel 6. The saw 13 will, therefore, clear both the arbor frame and the supporting channel as the saw may be moved or adjusted vertically. Since the arbor frame 10 is pivotally mounted on top of the supporting channel 6, it is evident that the arbor frame can be adjusted, that is, rotated relative to the supporting channel 6. Thus the saw 13 can be adjusted vertically, and also adjusted relative to the supporting channel 6.

A rod 14 is pivotally attached at one end to the channel 6. At its other end the rod 14 extends through and is slidable in a block 15. The block 15 is pivotally mounted between ears 16 which rise from the top of the arbor frame 10. A set screw 17 extends through the block 15 and bears against the rod 14 to thus fixedly hold the arbor frame 10 in a tilted relation to the supporting channel 6. A coil spring 18 surrounds the rod 14 and bears against the block 15 at one end, and against a collar 19 on the other end, and thus the arbor frame will be spring pressed to a normal position at right angles to the supporting channel 6.

An electric motor 20 is fixedly mounted on top of the arbor frame 10 and a suitable drive, such as the belt 21, extends from that motor to the quill 12, thus driving this quill and the saw 13.

The supporting channel 6 is tilted by the operator in the following manner: A foot pedal 22 is pivotally mounted on the lower end of a bracket 23. The bracket 23 depends from the frame 1. A ram 24 is slidably mounted in a block 25 on one of the legs 2. The outer end of the ram 24 is pivotally attached to a clevis 26, which clevis is in turn pivoted to the lower end of the supporting channel 6. A spring 27 surrounds the ram 24, one end of the spring bearing against the block 25 and the other end against a collar 28 on the ram 24, thus normally urging the ram to the position shown in Figure 1, and with the supporting channel 6 in a vertical position. A cable 29 is secured at one end to the foot pedal 22 and at the other end to the ram 24. The cable 29 extends over shives 30 and 31 which are journaled on the frame 1. Thus when the foot pedal 22 is pushed downwardly the tension on the cable 29 will push the ram 24 rearwardly, and thus tilting the supporting channel 6 on its pivot 8. In this manner the saw 13 will be moved downwardly to a position where the saw can engage the stone, or the like, 5.

If it is desired to lock the supporting channel 6 in a tilted position, this can be accomplished as follows: A lock rod 32 is pivotally attached at one end to the supporting channel 6 and preferably to the clevis 26. The other end of the rod 32 extends through and is slidable in one arm of the angular tube 33. This angular tube is fixedly mounted on the frame 1. A piston 34 in the angular tube bears against the rod 32. The other end of the piston is tapered as shown at 35. A shaft 36, actuated by a hand wheel, is threaded into the angular tube 33, and the shaft is tapered as shown at 37. By threading the shaft 36 into the tube 33 the tapered surfaces 35 and 37 will engage and thus push the piston 34 against the rod 32, thus locking the rod and thereby holding the supporting channel 6 against any tilting movement until the rod 32 has been again released.

If it is desired to accurately position the saw 13 with relation to the top of the frame 1, this can be accomplished by means of the scale 38, one end of which extends through a block 39 on the quill 12. The scale 38 is slidable through the block, and when the lower end 40 of the scale rests on top of the frame 1 a reading can be taken on the scale so that the quill 12 and the saw 13 can be returned to this same position at a future time, if desired. This is desirable when a groove or channel is being cut on the rock, this groove being of fixed depth.

Having described my invention, I claim:

1. A masonry saw comprising a frame, a supporting channel, means pivotally mounting the supporting channel on the frame, an arbor frame, means pivotally mounting the arbor frame on the upper end of the supporting channel, a foot pedal, means extending from the foot pedal to the supporting channel whereby depression of the foot pedal will pivot the supporting channel on its mounting, a saw, means journaling the saw on the arbor frame, a motor mounted on the arbor frame, and drive means extending from the motor to the saw, and latch means engaging the supporting channel to fixedly hold said channel in a tilted position relative to said frame, said latch means comprising a rod mounted at one end on the supporting channel, and manually operable means engaging said rod to hold said rod and the channel against movement.

2. A masonry saw comprising a frame, a supporting channel, means pivotally mounting the supporting channel on the frame, an arbor frame, means pivotally mounting the arbor frame on the upper end of the supporting channel, adjusting means extending from the supporting channel to the arbor frame whereby the arbor frame may be tilted relative to the supporting channel, a foot pedal, means extending from the foot pedal to the supporting channel whereby depression of the foot pedal will pivot the supporting channel on its mounting, a saw, means journaling the saw on the arbor frame, a motor mounted on the arbor frame, and drive means extending from the motor to the saw, and latch means engaging the supporting channel to fixedly hold said channel in a tilted position relative to said frame, said latch means comprising a rod mounted at one end on the supporting channel, and manually operable means engaging said rod to hold said rod and the channel against movement.

3. A masonry saw comprising a frame, a carriage mounted on the frame on which the work is supported, a supporting channel, means pivotally mounting the supporting channel on said frame, a ram pivotally attached at one end to the supporting channel, means on the frame slidably mounting the ram, a foot pedal mounted on the frame, means extending from the foot pedal to the ram to move the ram longitudinally and tilt the supporting channel, an arbor frame pivotally mounted on the upper end of the supporting channel, a saw, means journaling the saw on the arbor frame, a motor mounted on the arbor frame, and drive means extending from the motor to the saw.

4. A masonry saw comprising a frame, a carriage mounted on the frame on which the work is supported, a supporting channel, means pivotally mounting the supporting channel on said frame, a ram pivotally attached at one end to the supporting channel, means on the frame slidably mounting the ram, a foot pedal mounted on the frame, means extending from the foot pedal to the ram to move the ram longitudinally and tilt the supporting channel, an arbor frame pivotally mounted on the upper end of the supporting channel, a saw, means journaling the saw on the arbor frame, a motor mounted on the arbor frame, and drive means extending from the motor to the saw, a rod pivotally mounted at one end on the supporting channel, a block mounted on the arbor frame, said rod being slidably mounted in the block, and a manually operable means extending into the block and engaging the rod.

5. A masonry saw comprising a frame, a carriage mounted on the frame on which the work is supported, a supporting channel, means pivotally mounting the supporting channel on said frame, a ram pivotally attached at one end to the supporting channel, means on the frame slidably mounting the ram, a foot pedal mounted on the frame, means extending from the foot pedal to the ram to move the ram longitudinally and tilt the supporting channel, an arbor frame pivotally mounted on the upper end of the supporting channel, a saw, means journaling the saw on the arbor frame, a motor mounted on the arbor frame, and drive means extending from the motor to the saw, and latch means engaging the supporting channel to fixedly hold the supporting channel in a tilted position relative to said frame.

6. A masonry saw comprising a frame, a carriage mounted on the frame on which the work is supported, a supporting channel, means pivotally mounting the supporting channel on said frame, a ram pivotally attached at one end to the supporting channel, means on the frame slidably mounting the ram, a foot pedal mounted on the frame, means extending from the foot pedal to the ram to move the ram longitudinally and tilt the supporting channel, an arbor frame pivotally mounted on the upper end of the supporting channel, a saw, means journaling the saw on the arbor frame, a motor mounted on the arbor frame, and drive means extending from the motor to the saw, a rod pivotally mounted at one end on the supporting channel, a block mounted on the arbor frame, said rod being slidably mounted in the block, and a manually operable means extending into the block and engaging the rod, and latch means engaging the supporting channel to fixedly hold the supporting channel in a tilted position relative to said frame.

References Cited in the file of this patent
UNITED STATES PATENTS

| | | |
|---|---|---|
| 2,557,672 | McGrath | June 19, 1951 |
| 2,581,777 | Wright | Jan. 8, 1952 |
| 2,591,206 | Scott | Apr. 1, 1952 |
| 2,624,984 | Zuzelo | Jan. 13, 1953 |
| 2,682,262 | Schultz | June 29, 1954 |